Feb. 21, 1967     P. OCHS     3,304,771
TORQUE WRENCH
Filed Aug. 10, 1961
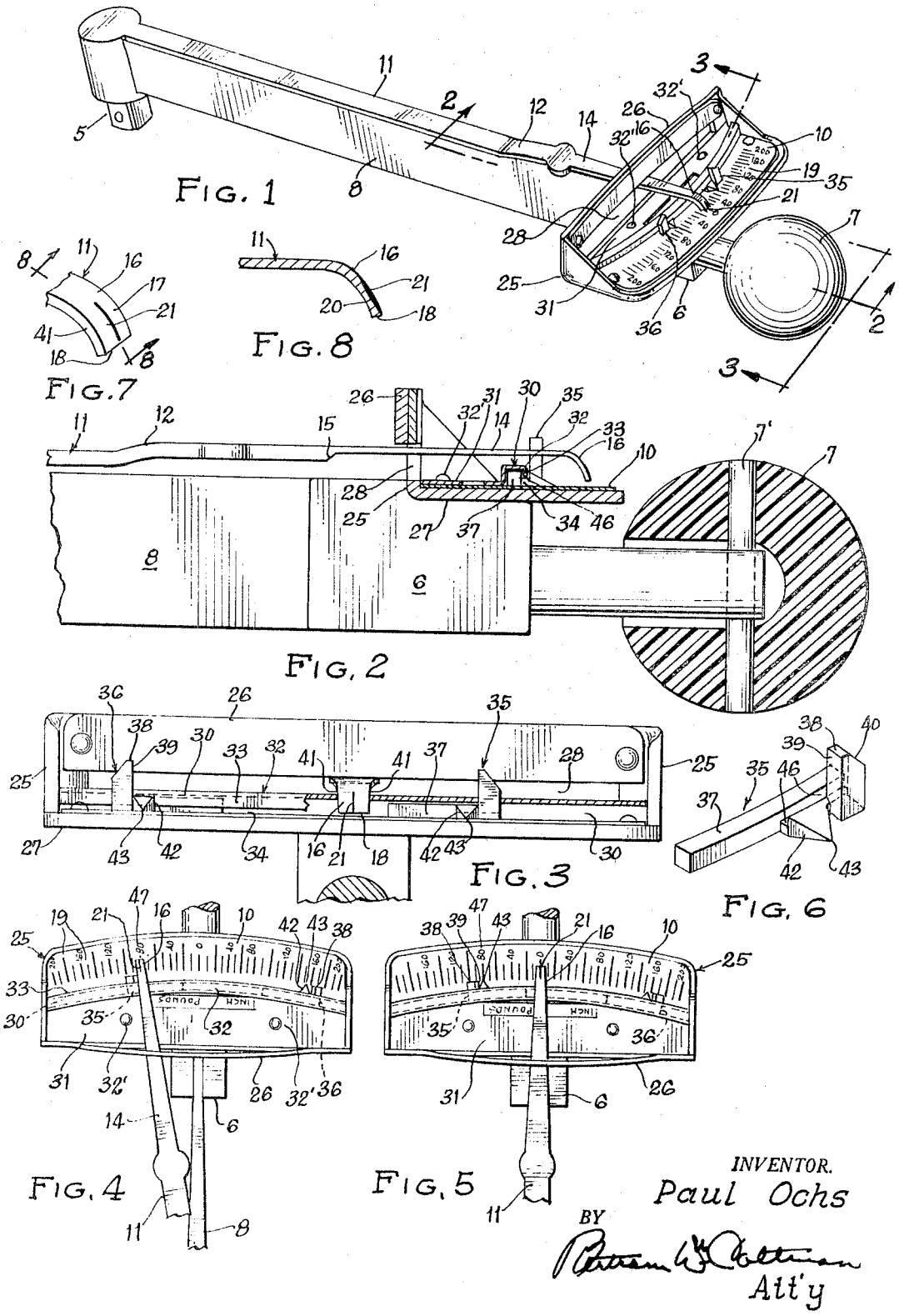
INVENTOR.
Paul Ochs
BY
*Bertram W. Coltman*
Att'y United States Patent Office 3,304,771
Patented Feb. 21, 1967

3,304,771
TORQUE WRENCH
Paul Ochs, Glen Ellyn, Ill., assignor to P. A. Sturtevant Co., Addison, Ill., a corporation of Illinois
Filed Aug. 10, 1961, Ser. No. 130,646
1 Claim. (Cl. 73—139)

This invention relates to a force-transmitting mechanism and more particularly to a mechanism of the type employing a novel form of recording the reading as distinguished from a visual reading of the torque applied to the work.

The invention may be specifically applied to a torque measuring wrench having a work-engaging member, a head member, and a resilient member operatively disposed relative to the same so that when the handle is grasped and rotated in an arc in either direction, the force applied at the handle is transmitted to the work. As the resistance of the work causes the resilient member to flex, the head and the handle rotate or pivot relative to the work-engaging member. The force applied to the handle continues to move the head and the handle in an arc with the work-engaging member as a pivot as the work is tightened. The pivotal movement between the head member and the work-engaging member may be measured at a scale by a pointer. The reading of the scale correctly represents the force or torque applied by the work-engaging member to the work.

The purpose of a torque measuring wrench to apply a predetermined torque to nuts, bolts, studs or the like, and to secure thereby uniform tightening, or to loosen fasteners to determine the degree of tightness, or to check the torsional strength of parts and delicate mechanisms, or to check the resistance of rotating parts and mechanisms, has often failed due to the use of the wrench in locations making the reading of its scale difficult, or in case of strength tests when the maximum reading occurred rapidly and makes difficult the ability to detect the highest reading on the scale of a torque wrench. If a visual reading is to be relied upon, it is quite evident that an accurate reading of the scale is impossible unless the operator has a full view of the scale.

It is the object of this invention to overcome those difficulties in the reading of the scale by providing, in conjunction with the indicating pointer, a novel form of recording device for retaining the reading of the force applied at the work-engaging member, as shown by the pointer and the scale after the torque measuring wrench has been used to complete a work cycle.

It is a further object of this invention to provide a recording device of this type in simple form that does not greatly add to the cost of the torque measuring wrench but which is accurate and retains the reading recorded until manually reset by the operator.

In this connection, the recording device may be disposed in a location convenient to the scale and associated therewith so that as the pointer is moved in either direction, indicating members are moved with the pointer and show upon the scale the extent of their movement when the pointer is released and allowed to return to zero.

In the specific form of device disclosed herein, these recording members may be slidably carried in a channel disposed in close proximity to the calibrations upon the scale and function therewith to indicate the maximum movement of the pointer produced by the rotary or pivotal movement between the head member and the work-engaging member by the application of force at the handle or head member.

Other objects and advantages of the invention will be apparent from the following detail description of the invention and the accompanying drawing, in which:

FIGURE 1 is a perspective view of a torque measuring wrench embodying the present invention;

FIG. 2 is an enlarged sectional view taken along line 2—2 of FIG. 1 and looking in the direction of the arrows;

FIG. 3 is also an enlarged sectional view but taken along line 3—3 of FIG. 1;

FIG. 4 is a view looking downwardly at the scale and the cooperating end of the pointer to show how the cooperating pointer end will function to operate a recording member;

FIG. 5 is a similar view but showing the pointer returned to zero position and the recording member remaining at its set position to indicate the torque applied to the wrench in the operation shown in FIG. 4;

FIG. 6 is an enlarged perspective view of a recording member;

FIG. 7 is an enlarged detail section of the tip of the pointer; and

FIG. 8 is a longitudinal cross-sectional view of this pointer tip taken along line 8—8 of FIG. 7.

The wrench illustrated in FIGS. 1 to 6, inclusive, includes a work-engaging member 5, a head member 6 and a handle 7 pivotally connected to head member 6 by pin 7'. A flat spring bar or resilient member 8 is so disposed with respect to the work-engaging member 5 and the head member 6 that when the handle 7 is grasped and rotated in an arc in either direction, the force or pressure applied is transmitted through head member 6, resilient member 8 and the work-engaging member 5 to the work. As the resistance of the work causes the resilient member 8 to flex, head member 6 and handle 7 will rotate relative to the work-engaging member 5. The force applied to the handle 7 will continue to move the handle in an arc with the work-engaging member 5 as a pivot as the work is tightened. This rotary or pivotal movement between the handle 7 and the work-engaging member 5 is measured at a scale 10 mounted upon head member 6 by a pointer 11 secured to the work-engaging member 5.

It will be observed that in the type of wrench disclosed, applicant provides two relatively movable members which are so arranged that one of them operatively engages the work and is known as the work-engaging member. The other member is the handle or head member, and the relative movement between the work-engaging member and the handle or head member is yieldably opposed by the resilient member. The force applied through the wrench is determined by measuring the extent of the relative movement between these two parts. The resilient member has one end extending across the axis of rotation of the work-engaging member, this resilient member then extending rearwardly therefrom longitudinally of the handle member in radial relation to the axis of rotation of the work-engaging member and the other end being pivotally connected to the head. This arrangement of parts provides a substantially continuous moment arm of substantially constant length.

Pointer 11 may be fixedly secured to the work-engaging member 5 so that it may appear to be an integral part thereof. It may taper, however, and be offset upwardly at 12 so as to raise its forward portion 14 above the face of scale 10. This forward portion 14 may be tapered, which taper may continue with the taper of the pointer in its entirety, as shown in FIG. 1, and beginning at point 15, it may be also tapered in thickness and then curved downwardly at its tip 16, this being clearly shown in FIG. 2. It will be noted that this tip 16 does not end in a point but has a somewhat flat but slightly curved face 17 and an edge 18 adapted to ride above the graduations 19 on the upper face of indicator 10. Face 17 is provided with a recess 20, which may be filled with a black epoxy resin to provide a permanent indicating line 21 which will assure a more accurate reading of the indicator scale markings 19.

At this forward end of the wrench, a suitable bracket 25 is attached to head member 6 preferably in permanent relation, this bracket having an upstanding back wall 26 and a horizontal floor 27 upon which the indicator plate 10 is mounted. Back wall 26 is slotted at 28 and the upper part of the wall 26 above this slot 28 is slightly curved. Pointer 11 extends forwardly through slot 28. An arcuate track 30 is provided crosswise of indicator plate 10 by means of a member 31 that may be attached in any suitable manner, say, as by riveting, as shown at 32', to floor 27 of bracket 25, but with the indicator plate 10 mounted therebetween. Member 31 forms arcuate track 30 by a channel-formed part 32 terminating at the front with a turned-down front wall 33 that leaves a front opening 34 for this arcuate track 30.

One or more recording indicating members 35 and 36 may be disposed within arcuate track 30. These members are so constructed that either will move in this arcuate track 30 when engaged by tip 16 of pointer 11. The structure of these members is shown in FIG. 6. Each comprises an arcuate elongated arm 37 that will lie and ride in track 30. An upstanding integrally-formed shoulder 38 is formed at what may be termed the outside end of each arm 37. Each shoulder 38 may have a flat face 39 and a back face tapered at 40 if so desired. These flat faces 39 are adapted to be engaged by the side faces 41 of pointer tip 16. Also provided as a part of recording indicating members 35 and 36 are indicating pointers 42 projecting forwardly with their tips 43 being so located that they will align or register with the same calibration 19 on scale 10 at which indicating line 21 of pointer tip 16 will stop when force is applied at the handle 7 and is continued to move the head member 6 and the handle 7 in an arc with the work-engaging member 5 as the pivot. This so-called relative movement of pointer tip 16 along scale 10 as the result of the flexing of resilient member 8 will bring a side face 41 of pointer tip 16 against a flat face 39 of one of the shoulders 38. Depending, of course, upon the direction of deflection, pointer tips 16 will move one of the recording indicating members 35 or 36. With the tip 43 of the pointer 42 lying directly below the indicating line 21 on pointer tip 16, it is obvious that these recording indicating members 35 and 36 will accurately indicate the torque or force applied by the handle and will remain in position to record the proper reading upon the scale 10 when the pointer 11 is released to return to zero position as the result of the force no longer being applied by the handle.

It will be observed that shoulders 38 and pointers 42 are grooved at 46 so that front wall 33 of part 32 may extend downwardly thereinto to confine these members 35 and 36 within arcuate track 30 and thus prevent their displacement.

FIG. 4 illustrates the deflection of pointer 11 to the left as the result of the flexing of resilient member 8 caused by the relative pivotal movement between handle 7 when force is applied thereto and the work-engaging member 5. If the calibration of scale 10 is in inch pounds, then, in this particular instance, the pointer's tip 11 indicates by its indicating line 21 that a torque of 80 inch pounds is being applied to the handle 7, head member 6 and the work-engaging member 5 through resilient member 8. The indicating member 35 has been engaged and moved by pointer tip 16 to the left, it being observed in this view that pointer 42 of this member 35 lies directly under pointer tip 16. There is sufficient friction between the extended arcuate elongated arm 37 and the walls of channel 30 to keep member 35 in the position it has been moved to by this pointer tip 16 when the pointer 11 is released and allowed to return to zero position as shown in FIG. 5. The calibration line of 80 inch pounds has been designated as 47 in FIGS. 4 and 5. It will be noted by referring to FIG. 5 that with member 35 remaining in the position it has been moved to by pointer 11, the tip 43 of pointer 42 will also be aligned or registered with this calibration line 47 to indicate for record purposes that an application of a force equal to a torque of 80 inch pounds has just been applied by the handle 7 to the work-engaging member 5.

It will be apparent therefore that a torque wrench embodying the present invention need not be read at the time of applying the torque. It may be read instead after the torque is applied and the recorded reading by either member 35 or 36 will show the exact torque that was applied and so indicated by the pointer at the scale. It is therefore not necessary to have the torque wrench in a position of reading at the time it is used. This is a substantial advantage because a torque wrench must, or can, be used in many instances when the location of the scale at the time will not expose the calibrations or the position of the pointer with respect to these calibrations. It is also not necessary to employ two indicating members 35 and 36 inasmuch as one may be employed if the wrench is to be moved in one direction only, depending, of course, upon its particular use at the time.

Without further elaboration, the foregoing will so fully explain the character of my invention that others may, by applying current knowledge, readily adapt the same for use under varying conditions of service, without eliminating certain features, which may properly be said to constitute the essential items of novelty involved, which items are intended to be defined and secured to me by the following claim.

I claim:

A torque measuring wrench comprising a work-engaging member, a head member, a resilient member disposed between said head member and said work-engaging member, means for indicating the force applied to the work for registering the extent of relative rock movement of said work-engaging member and said head member, and a handle member at one end of said head member, said force indicating means including a graduated scale in fixed relation to said head member, a pointer having a free end cooperating with said scale to indicate the force applied at said handle through said resilient member to said work-engaging member, a platelike member secured to said scale, said platelike member being so formed as to provide a track adjacent to the graduations of said scale, slidable indicating members having portions riding in said track, said indicating members being provided each with a second portion engageable by the tip of said pointer and each having a third portion cooperating with the graduations of said scale, the said tip of said pointer and said third portion of each indicating member being in registering alignment with each other when the indicating member is moved by said pointer.

References Cited by the Examiner
UNITED STATES PATENTS

| | | | |
|---|---|---|---|
| 1,606,936 | 11/1926 | Hapgood | 116—129 |
| 2,549,190 | 4/1951 | Gilchrist | 116—129 |
| 2,949,770 | 8/1960 | Kernan et al. | 73—93 |

FOREIGN PATENTS 621,277   1/1927   France.

OTHER REFERENCES

Duro Metal Products Co., Circular, p. 27 (received in Patent Office Mar. 1, 1941).

RICHARD C. QUEISSER, *Primary Examiner.*

DAVID SCHONBERG, *Examiner.*